Jan. 7, 1964  W. W. BIRD  3,116,746
SECTIONALIZED AIR SUPPORTED STRUCTURES
Filed June 2, 1958  3 Sheets-Sheet 1
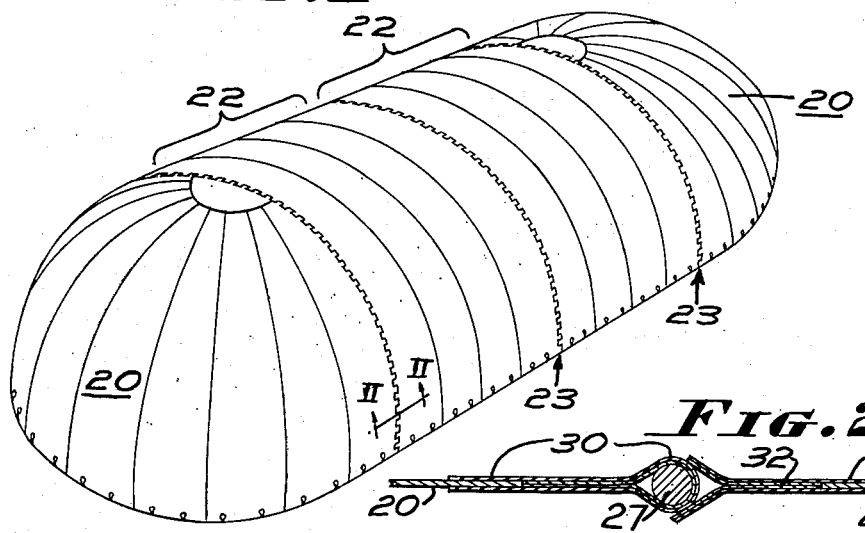
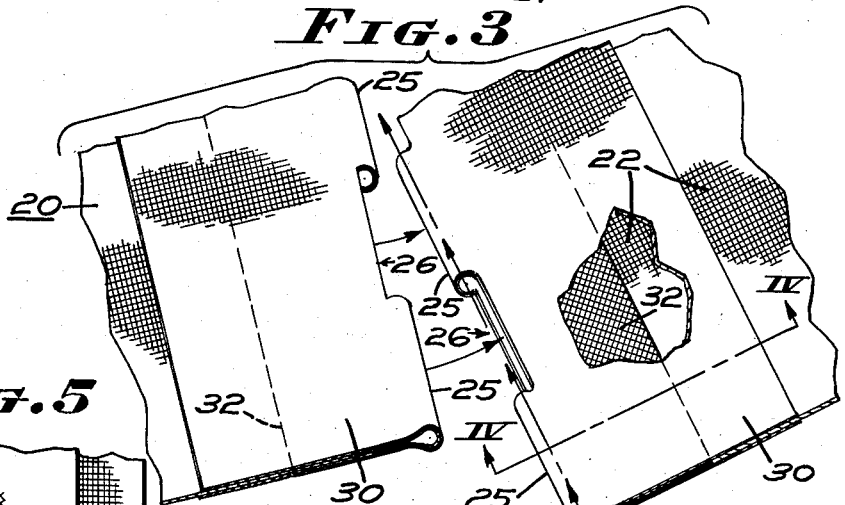
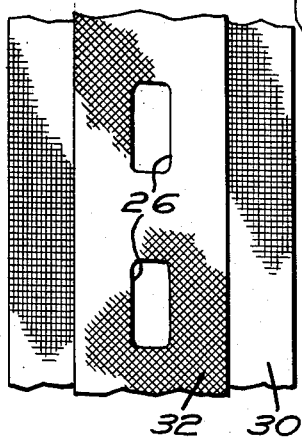
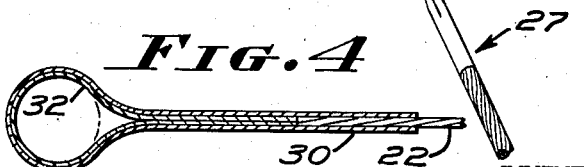
INVENTOR:
WALTER W. BIRD
BY:
Beau, Brooks, Buckley & Beau,
ATTORNEYS Jan. 7, 1964 W. W. BIRD 3,116,746
SECTIONALIZED AIR SUPPORTED STRUCTURES
Filed June 2, 1958 3 Sheets-Sheet 2
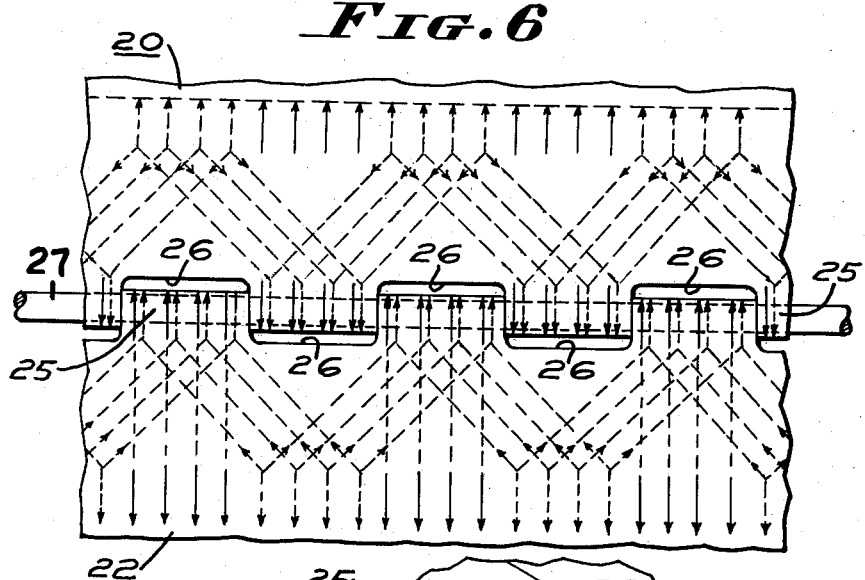
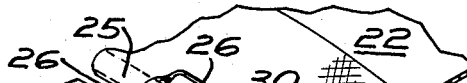
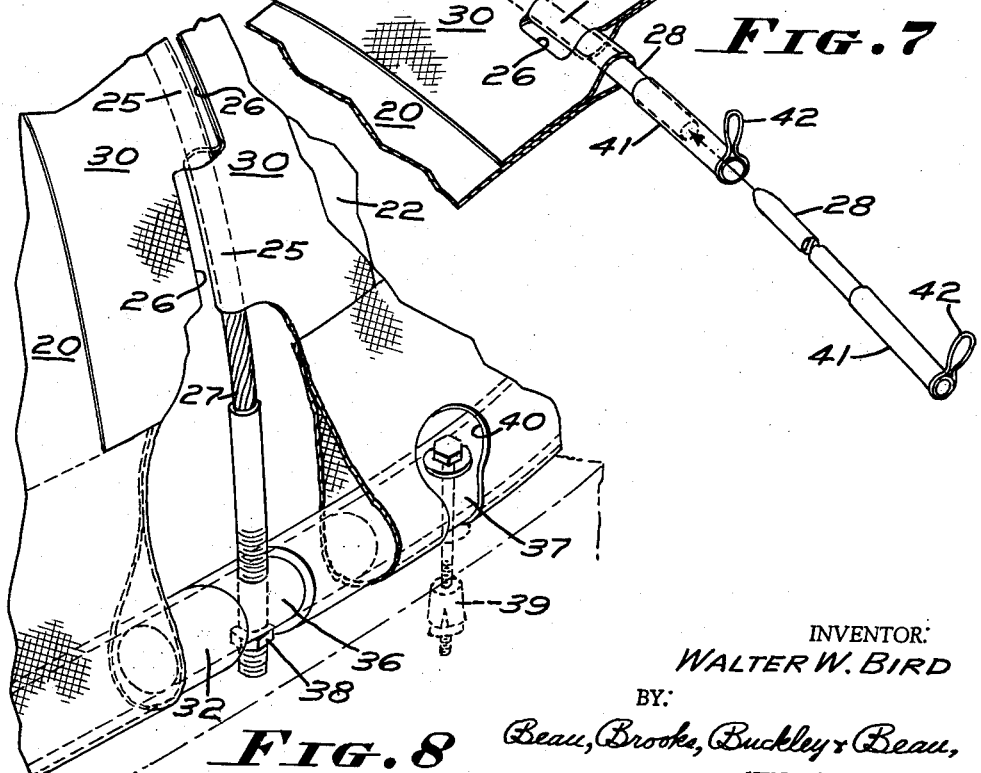
INVENTOR:
WALTER W. BIRD
BY:
Beau, Brooks, Buckley & Beau,
ATTORNEYS.

Jan. 7, 1964 W. W. BIRD 3,116,746
SECTIONALIZED AIR SUPPORTED STRUCTURES
Filed June 2, 1958 3 Sheets-Sheet 3
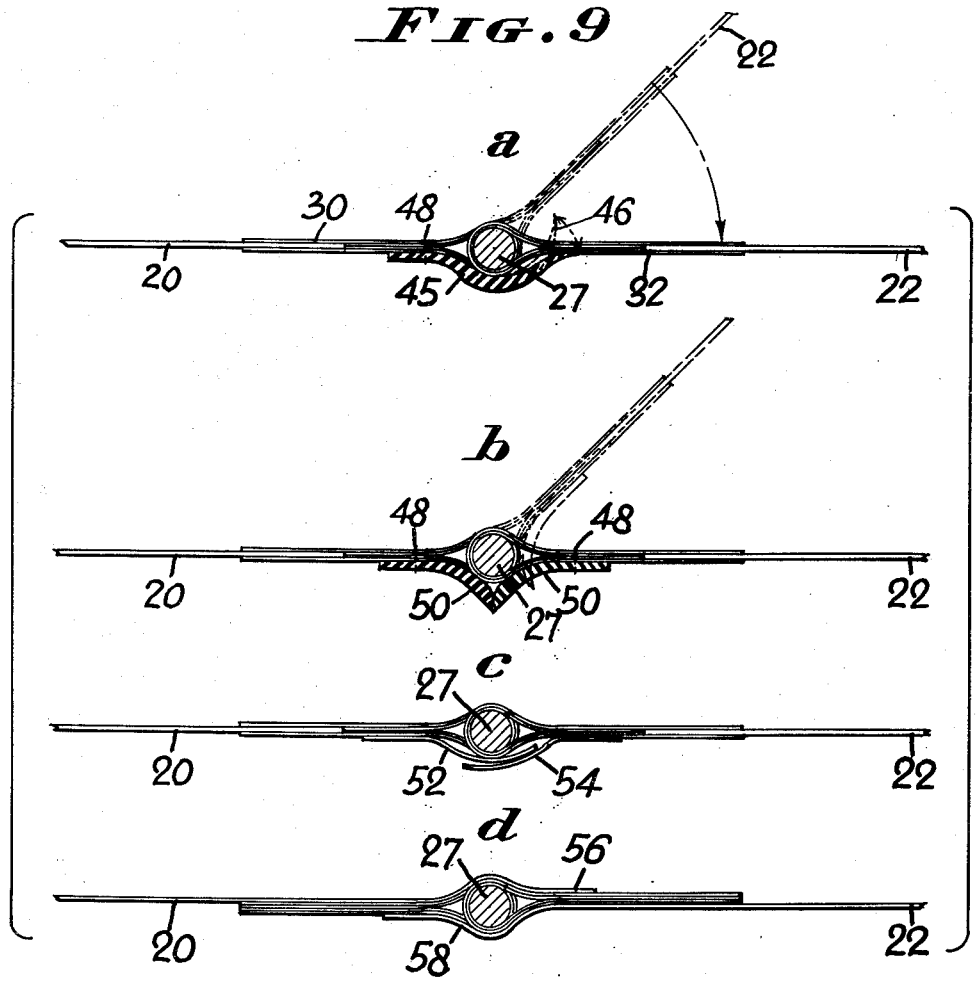
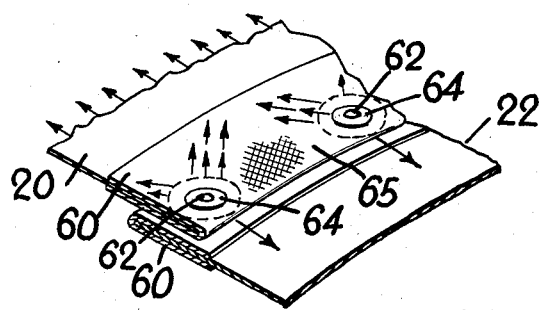
INVENTOR:
WALTER W. BIRD
BY:
Beau, Brooks, Buckley & Beau,
ATTORNEYS.

United States Patent Office 3,116,746
Patented Jan. 7, 1964

3,116,746
SECTIONALIZED AIR SUPPORTED STRUCTURES
Walter W. Bird, Williamsville, N.Y., assignor to Birdair Structures, Inc., Buffalo, N.Y.
Filed June 2, 1958, Ser. No. 739,022
8 Claims. (Cl. 135—1)

This invention relates to modular-type, air supported structures built of flexible fabric or similar material, and, more particularly, to provision in such structures for improved means of affecting the detachable connections between the structural components.

The primary object of this invention is to provide improved, structurally simple means for detachably joining flexible sheet elements in such a manner as to transfer loads across the joints in a highly efficient manner. Another object is to provide a joint as aforesaid of substantially air tight and water tight construction which will facilitate sectionalized construction and modularized assembly, disassembly, and rearrangement operations. Another object is to provide a joint as aforesaid which will withstand rigorous use, but which, if damaged, will continue to function efficiently. Another object is to provide a joint as aforesaid which is so constructed that in event of abuse any rupture of the joint elements will not tend to propagate and may be easily repaired in the field. Other objects and advantages of this invention will appear in the specification hereinafter wherein the accompanying drawings are identified as follows:

FIG. 1 is a perspective view showing an air supported, shelter-type structure embodying modular section joining means of the present invention;

FIG. 2 is a fragmentary section, on enlarged scale, taken along line II—II of FIG. 1;

FIG. 3 is a fragmentary perspective of a detail of the fabric joining means of the invention, illustrating the mode of interconnection;

FIG. 4 is a section taken along line IV—IV of FIG. 3;

FIG. 5 is a fragmentary plan of a component of the joiner device of FIGS. 2, 3, illustrating elements of the latter in their initial flat pattern form;

FIG. 6 is a schematic view illustrating the pattern of load transfer across a joint of the invention;

FIG. 7 is a view corresponding to FIG. 3 of a modified form of interconnecting arrangement;

FIG. 8 is a fragmentary perspective of a terminal end portion of a joiner device of the invention, with portions of the fabric broken away showing the end of the attaching cable of the joiner device and its securement to a ground anchor device;

FIGS. 9a, b, c, and d are sections through alternative forms of the joiner device illustrating means of providing essentially air and water tight connections;

FIG. 10 is a fragmentary perspective view of a flexible sheet edge portion mounting a load distributing device in accord with the invention.

As shown in FIG. 1, the invention is embodied in an air supported structure built of a flexible, relatively air tight, material having two spherical end sections, 20, 20, joined to two center sections 22, 22, by means of joiners of subject invention designated generally at 23. Each joiner is constructed by arranging two flat strips 30, 32 of strong flexible fabric as shown in FIG. 5 with the outer strip 30 arranged with its yarns running substantially perpendicular and parallel to the length of the strip. The strip 32 is of a a narrower width, may be a fabric having its weave running on a 45 degree bias or may be a substantially isotropic strong flexible film material such as a synthetic plastic, is bonded to the first strip by means of cement, heat sealing, sewing, or other suitable means which will assure a good transfer of load between the two strips of material. This assembly is then punched to provide openings 26 approximately as illustrated in FIG. 5, along the approximate center line of the strips. The assembly is then folded over on itself as shown in FIG. 4, and is bonded to itself and to the marginal edges of its connected structure 20, 22 as the case may be. Thus the holes 26 form alternate loop and slot portions designated 25 and 26 (FIG. 3). The joiners are positioned on adjacent sections of the structure so that the loops and slots mesh together; and cable 27 as illustrated in FIGS. 2, 3; or a rod 28 as shown in FIG. 7 is then passed through the alternate loops, thus joining the adjacent sections together to provide a strong, structural attachment. When joined in this manner, a snug-fitting assembly is provided. The inner edges of the slots 26 are cut to fit snugly around the corresponding loops 25 on the joining section, to initially provide a substantially air and water tight connection as shown in FIG. 2. That is to say, the width or depths of the cut-outs or slots 26 are less than the circumference of the cable or rod so that the inner edges of the slots partially embrace the cable or rod as is shown in FIG. 2. Here it can be seen how the loop sections wedge in between the leafs of the slot sections, and thus the internal air pressure helps to seal the joint.

When a cable 27 is used in connection with this joiner, the free ends of the cable are preferably fixed in position and are thereby prevented from being pulled out of position by means of a take-up device as illustrated in FIG. 8. As shown herein, a swaged threaded end terminal on the cable is passed through a hole in a rod, 36, which in turn is inserted into the ends of hold-down pipes 37. The cable length is adjusted by means of a nut 38. Thus, anchorage of the cable to the ground or base structure is accomplished by means of anchor bolts 39. Access to the anchor bolt heads is obtained through slots 40 provided in the skirts of the structure 20—22. When a flexible rod is used to join the sections, as illustrated in FIG. 7, the rods are cut in lengths which are convenient to handle and are each equipped with a ferrule section 41, on one end, into which the tip of the adjacent rod is slip-fitted to assure a strong, continuous attachment. In addition, the ferrule 41 is equipped with a small, looped handle 42 to facilitate handling of the rod. When assembled, these handles project out from between the adjacent loop sections, and serve to lock the rods in place when the rods are slipped into their assembled positions.

The efficiency of this joint is greatly increased, and an improved distribution of load is achieved by the bias construction and distribution of load across the joint as diagrammatically shown in FIG. 6. In order to provide the slots 26, one-half of the looped portion 25 along the length of the joint is cut away to provide froom for the corresponding loops of the mating parts. The load on the loop is therefore twice that of the average load on the material adjacent to the joint. In order to prevent undue concentrations of loads on these loop elements, and to provide redistribution of these loads into the basic structure with minimum distortion thereof, the members 32 are arranged on a bias, or a strong, substantially isotropic film capable of transferring this load, may be used. With this construction, as shown in FIG. 6, the load acting on the panels 20—22 opposite the cut-outs 26 therein for the loops 25 are redistributed longitudinally through cords of bias ply 32 into the loop portions 25, as shown by the dotted lines and arrows indicating the components of load. The slotted portions of the device do not carry any loads, but lay over the corresponding loop 25 (FIG. 2), thereby forming a relatively air and water tight seal. Thus, the bias construction reinforces the loops 25, thereby preventing excessive stress concentrations, and prevents excessive distortion of the panel edges between the loops, thus permitting the flaps to lay down flat and thereby forming good seals. In addition, the two ply bias arrangement gives an exceedingly strong, tear-resistant structure which will successfully resist normal service and/or abuse damage.

This invention makes it possible to join together for example the fabric components of an air supported structure in a simple effective manner. The resulting joint can uniformly transfer high tension and shear loads. It is sufficiently air and water tight for the contemplated use and, possibly most important, any rupture of the joint due to accidental damage will not propagate. It is thus an ideal joint for "air structures." The construction of the joint is such that it can be readily repaired in the field if damaged, in many cases without even taking the structure down. The joint can be used to provide complete inter-changeability of elements, thus making it possible to provide modular elements of a structure which can be jointed in a variety of forms to meet various service requirements. The use of a cable connection for small units provides a simple connection, whereas the short rod sections used in multiple lengths and automatically locked into place can be used to easily and effectively join the largest of sections.

FIGS. 9a, b, c, and d illustrate modified forms of air and weather sealing devices such as may be used across the joint in lieu of the flap arrangement illustrated in detail in FIG. 2. In the case of FIG. 9a, a supplemental flap as indicated at 45 formed of resilient material "set" in a sectional configuration substantially as indicated by the broken line showing at 46 is stitched or otherwise fastened along one edge as indicated at 48 to the envelope material 20 at one side of the joint. Thus, the flap member 45 extends therefrom in cantilever fashion, substantially hugging the joint without interfering with flexure thereof, while the free end portion 46 of the flap member tends to follow displacement of the opposite envelope portion 22 at the other side of the joint. Hence, the flap 45 is adapted to function so as to substantially air and weather seal the joint.

FIG. 9b illustrates a modified form of sealing flap comprising a pair of cantilever mounted resilient flap members 50–50 disposed to relatively abut at their opposite free edges in elastically deflected condition as illustrated by solid lines in FIG. 9b. Thus, this form of flap device also provide an efficient air and weather seal without tendency to interfere with relative flexing of the envelope material at opposite sides of the joint.

FIG. 9c illustrates another form of sealing arrangement wherein flexible flaps 52, 54, are fixed by cementing or stitching or other devices at opposite sides of the joint so that their free edges extend into overlapping relation as shown in the drawing. Hence, the air pressure inside the structure tends to maintain the flaps in air and weather sealing bearing relation, without interference with flexure of the joint.

FIG. 9d illustrates a construction wherein the relatively articulated loop devices extending from the envelope portions 20, 22, are fixed thereto by any suitable means such as cementing or stitching (not shown) or the like. The envelope portions 20, 22 per se are formed to include integral extending flap portions 56, 58, riding over and under, respectively, the joint construction; thereby providing weather and air sealing flaps without interference with flexure of the joint.

FIG. 10 illustrates a modified form of construction for joining opposed edge portions of the envelope fabric. As shown in the drawing, the envelope pieces 20—22 are enclosed at their edges by reverse-folded bias-cut fabric strips 60 and the latter are fixed to the envelope pieces 20—22 by suitable means such as cement, stitching, or the like. At suitable intervals the edge strips are interconnected by spaced fasteners as indicated at 62. Washers 64 are preferably employed under the heads of the fasteners so as to provide a better transfer of load into the fabric and then reduce the stress concentrations thereat. It is a particular feature of this arrangement that the fabric of the edge pieces 60 is disposed "on the bias" as indicated at the drawing at 65, because it is by virtue of this arrangement that the connection loads are transferred diagonally away from the regions of the fasteners (as illustrated diagrammatically at FIG. 6), and the loads thereof are taken efficiently by the bias-directed threads of the fabric strips 60 which transfer these loads into envelope pieces, as explained in connection with FIG. 6. It is contemplated that in lieu of the bias cut fabric, the edge pieces 60 may be formed of a suitable flexible isotropic material, whereby the loads referred to will be transmitted as described hereinabove.

It will of course be appreciated that whereas only a few forms and details of construction of the invention have been shown and described herein, various changes may be made therein without departing from the spirit of the invention or the scope of the appended claims.

I claim:

1. In an air supported flexible wall structure comprising a plurality of sectional components each terminating in a marginal edge, means for detachably interconnecting said edges, said means comprising flexible substantially isotropic edging members fixed thereto and relatively spaced fasteners interconnecting the joined edges whereby loads across the joint are directed through one component convergently upon said fasteners and are taken thereby across the joint and are then redistributed into a substantially uniform pattern throughout the opposite component.

2. An air supported flexible wall structure comprising a plurality of flexible sectional components each subjected to isotropic tension forces in the plane thereof and terminating in a marginal edge, means for detachably interconnecting said edges, said means comprising along each edge alternately disposed looped and notched edge portions arranged to mate with complementarily shaped looped and notched edge portions of the joining component, flap means carried by said component to extend eccentrically of said looped portions into said mutually lapping weather-sealing relation across the juncture therebetween, and locking means comprising a rod-like means slidable endwise through the intermeshed looped portions of said components to interconnect the latter, said looped portions being structurally reinforced by substantially isotropic sheet members fixed thereto whereby structural loads across the joint are diagonally diverted from the notch portions into the adjacent looped portions and transferred thereat through said locking means across the joint and are then redistributed into a substantially uniform pattern throughout the opposite component.

3. An air supported flexible wall structure comprising a plurality of sectional components each subjected to isotropic tension forces in the plane thereof and terminating in a marginal edge, means for detachably interconnecting said edges, said means comprising alternately disposed looped and notched edge portions arranged to mate with complementarily shaped looped and notched edge portions of the joining component, and locking means comprising a rod-like means slidable endwise through the intermeshed looped portions of said components to interconnect the latter, said looped portions being structurally reinforced by bias fabric sheet members fixed thereto whereby structural loads across the joint are diagonally diverted from the notch portions into the adjacent looped portions and transferred thereat through said locking means across the joint and are then redistributed into a substantially uniform pattern throughout the opposite component.

4. In an air supported flexible wall structure comprising a plurality of sectional components each terminating in a marginal edge, means for detachably interconnecting said edges, said means comprising along each edge alternately disposed looped and notched edge portions arranged to mate with complementarily shaped looped and notched edge portions of the joining component, and locking means comprising a telescopic-jointed rod-like means slidable endwise through the intermeshed looped portions of said components to interconnect the latter and having laterally extending handle means fitting between adjacent looped portions to lock said device in operative position, said looped portions being structurally reinforced whereby structural loads across the joint are diverted from the notch portions into the looped portions and transferred thereat through said locking means across the joint and are then redistributed into a substantially uniform pattern throughout the opposite component.

5. In an air-inflated building structure, a substantially air-impervious flexible envelope subjected to tension in the inflated condition, said envelope comprising a plurality of separate flexible panels disposed in edge-to-edge relation, and means detachably joining said panels, the improvement consisting in joiner means along the edge of each panel to uniformly transfer tension loads from the main body of one panel to the main body of the adjacent panel to the avoidance of localized stress concentrations in any of the panels as occasioned by inflation pressure or weather loads on the structure; each joiner means comprising inner and outer strips of flexible material along the edges of said panels to be joined, said inner strip being of substantially less width than said outer strip and centrally positioned relation thereto, leaving marginal opposite edge portions of the outer strip free and unencumbered, said strips being provided with generally rectangular cut-outs centrally between the opposite sides thereof and being folded along their longitudinal center line sandwiching the edge of an associated panel between said free marginal edge portions of the outer strip with the side edges of the inner strip abutting the side edge of the panel, said free marginal edge portions of the outer strip being fastened to said associated panel throughout the longitudinal extents thereof, the leg portions of said inner strip laterally of the opposite sides of said cut-outs being adhesively bonded throughout their areas to the outer strip to effectively transfer load thereto, said cut-outs being of a length substantially equal to the longitudinal spacing therebetween so that the joiner means present a series of alternate notches and loops of substantially equal length, the loops of one joiner means being interdigitated with the loops of the other joiner means, and rod means projecting through said loops for transferring tension loads between joiner means, the inner strip in each case being formed of material cut on the bias so that the threads thereof run at 45° angles to the direction perpendicular to the edge of the panels.

6. The assembly as defined in claim 5 wherein said rod means are of circumference greater than the width of said cut-outs so that the joiner means partially embrace, and thereby seal against, said rod means along the lengths of the panels.

7. In an air-inflated building structure, a substantially air-impervious flexible envelope subjected to tension in the inflated condition, said envelope comprising a plurality of separate flexible panels disposed in edge-to-edge relation, and means detachably joining said panels, the improvement consisting in joiner means along the edge of each panel to uniformly transfer tension loads from the main body of one panel to the main body of the adjacent panel to the avoidance of localized stress concentrations in any of the panels as occasioned by inflation pressure or weather loads on the structure; each joiner means comprising inner and outer strips of flexible material along the edges of said panels to be joined, said inner strip being of substantially less width than said outer strip and centrally positioned relative thereto, leaving marginal opposite edge portions of the outer strip free and unencumbered, said strips being provided with generally rectangular cut-outs centrally between the opposite sides thereof and being folded along their longitudinal center line sandwiching the edge of an associated panel between said free marginal edge portions of the outer strip with the side edges of the inner strip abutting the side edge of the panel, said free marginal edge portions of the outer strip being fastened to said associated panel throughout the longitudinal extents thereof, the leg portions of said inner strip laterally of the opposite sides of said cut-outs being adhesively bonded throughout their areas to the outer strip to effectively transfer load thereto, said cut-outs being of a length substantially equal to the longitudinal spacing therebetween so that the joiner means present a series of alternate notches and loops of substantially equal length, the loops of one joiner means being interdigitated with the loops of the other joiner means, and rod means projecting through said loops for transferring tension loads between joiner means, the inner strip in each case being formed of isotropic material.

8. In an air-inflated building structure, a substantially air-impervious flexible envelope subjected to tension in the inflated condition, said envelope comprising a plurality of separate flexible panels disposed in edge-to-edge relation, and means detachably joining said panels, the improvement consisting in joiner means along the edge of each panel to uniformly transfer tension loads from the main body of one panel to the main body of the adjacent panel to the avoidance of localized stress concentrations in any of the panels as occasioned by inflation pressure or weather loads on the structures; each joiner means including a folded strip of isotropic material for transferring tension loads substantially uniformly into its associated panel, each such strip being folded upon itself along the length of the panel edges with which it is associated to present alternate loops and notches, each strip having opposite side edge portions beyond such loops and notches within which tension loads from the loops are diagonally spread for uniform transfer along the edge of the panel, means joining such opposite side edge portions of the strips to their associated panels, the loops of the joiner means being interdigitated, and rod means extending through said loops to transfer tension loads between the joiner means.

References Cited in the file of this patent

UNITED STATES PATENTS

| 1,302,182 | Lanchester | Apr. 29, 1919 |
| 1,377,788 | Pennewell | May 10, 1921 |
| 1,982,807 | Henderson | Dec. 4, 1934 |
| 2,545,817 | Krupp | Mar. 20, 1951 |
| 2,923,305 | Cline | Feb. 2, 1960 |

FOREIGN PATENTS

| 14,811 | Great Britain | Sept. 19, 1889 |
| 358,094 | Great Britain | Oct. 5, 1931 |
| 1,107,168 | France | Dec. 28, 1955 |